Sept. 2, 1969   M. B. SAMPSON ET AL   3,464,712
CHUCK

Filed Sept. 17, 1965   2 Sheets-Sheet 2

INVENTORS
MERRITT B. SAMPSON
ALAN H. YOUNG
BY *Watts & Fisher, attys.*

3,464,712
CHUCK
Merritt B. Sampson, Shaker Heights, and Alan H. Young, Bedford, Ohio, assignors to The S-P Manufacturing Corporation
Filed Sept. 17, 1965, Ser. No. 488,061
Int. Cl. B23b *31/16, 5/22, 5/34*
U.S. Cl. 279—120    5 Claims

ABSTRACT OF THE DISCLOSURE

A machine tool chuck having lever actuated jaws. Each jaw lever is fixed directly in a bore in the chuck body. Spacers on the lever pin interposed between the lever and chuck body maintain the lever in alignment during movement about the pin. Internal portions of the chuck are closed by seals that effectively seal the internal working parts from contaminants.

---

This invention relates generally to adjustable universal chucks, and more specifically to a new and improved universal chuck with radially movable jaws.

Universal chucks are used in conjunction with machine tools, such as lathes for holding a workpiece. The workpiece is held by a plurality of radially movable jaws. The jaws are movable simultaneously to close toward the axis of chuck rotation and are commonly actuated by a machine draw tube. The draw tube moves an annular draw cam axially of the chuck body. The annular draw cam is located centrally within the chuck body.

Where the chuck jaws are lever operated, a plurality of operating levers are also located within the chuck body, one such operating lever being associated with each chuck jaw. The operating levers are each mounted for pivotal movement on a lever pin. One end of each operating lever is associated with one of the chuck jaws. The other end of the operating lever is engageable with the axially movable draw cam. Axial movement of the draw cam relative to the chuck, pivots the operating levers about the associated lever pin to simultaneously move the chuck jaws relative to the center point of the chuck.

Because the jaws of the universal chuck close toward the axis of rotation, the chuck must be accurately fabricated so that the jaws will closely center the workpiece. The universal chuck of the present invention embodies several novel features that contribute to improved accuracy in centering a workpiece in the chuck, and includes other advantageous features as well.

In accordance with the present invention, an improved lever pin and operating lever construction is provided for operating the movable jaws of a universal chuck. Briefly, a through-pin construction is utilized where a fixed lever pin is mounted directly in an accurately bored passageway through the chuck body behind each movable jaw. An operating lever is supported on the pin in a freely rotatable manner. A spacing member, such as a washer, is positioned on each side of the operating lever, encircling the lever pin. These members maintain the operating lever in predetermined alignment with respect to an arcuate path of rotation of the operating lever about the lever pin. This prevents endwise movement. As a result of these features, the lever cannot become cocked with respect to its predetermined arcuate path of movement. Thus, a predetermined movement of the draw cam necessarily provides the same, precise degree of movement of each operating lever. This would not, of course, be true if any one operating lever was cocked or its relationship changed with respect to the lever pin, due to endwise movement.

With this arrangement, a high degree of accuracy is attained, as high as is normally experienced with a wedge type chuck, while at the same time providing the holding power of the lever type chuck. Because each lever pin is located directly in the body of the chuck rather than in pin bearings, greater strength and chuck body rigidity are provided, permitting greater draw bar pull and, hence, greater chuck holding power with high accuracy.

A further feature has been provided in the chuck of the present invention that contributes to the high degree of accuracy by reducing the wear of parts that is normally experienced with such a chuck. In accordance with the present invention, internal portions of the chuck are closed by seals, as between a back plate and the body of the chuck, that effectively seal the internal working parts, including the operating levers and the lever pins, from contaminants. This provides a sealed lubricant chamber which assures better jaw and lever lubrication. With the internal movable parts sealed within the chuck, it is practicable to maintain all moving parts, regardless of the position of the chuck, substantially completely surrounded by a lubricant, such as grease.

As a further feature of this invention a spring loaded ball is provided in the chuck body directly behind each movable jaw. The ball, acting as a friction amplifier, restrains movement of the jaw along the associated radially extending way. Due to the construction of the levers and the draw cam, there is a zone between the open position and the closed position of the jaws in which the cam surface of the draw cam does not positively engage the follower surface of the operating lever. Friction amplifiers provided in accordance with the present invention prevent movement of the chuck jaws by gravitational force during the period of adjustment when the draw cam is not in contact with the follower surface of the operating levers. Moreover, in the past, it was necessary to hand shape and fit each operating lever into its associated slot in the back of the chuck jaw in order to prevent loose movement of the jaw with respect to the opearting lever. This is no longer necessary with the detent of the present invention.

Other features and advantages of the invention will become apparent from the following detailed description when taken in conjunction with the accompanying drawings, in which.

Figure 1:
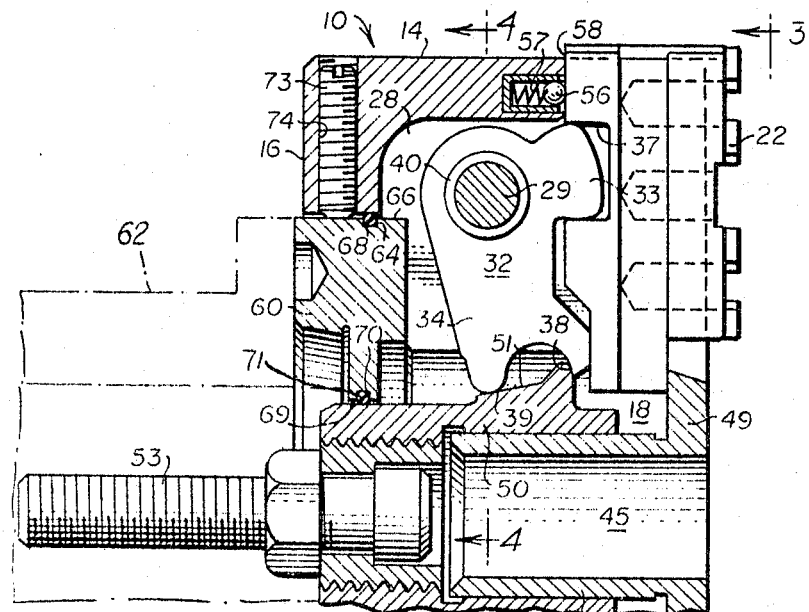
FIGURE 1 is a partial transverse sectional view of a chuck constructed in accordance with the present invention, showing the internal construction of the chuck, including the operating levers, draw cam, back plate and detents, the chuck being shown in an open position.

Referring now to the drawings, there is shown a universal chuck comprised of a cylindrical body 10 having a radial front face 12, a peripheral wall 14, a rear flange portion 16 and a central opening 18. Three equally spaced, radially extending, ways 20 extend through the body 10 of the chuck, opening through the front radial face 12 and the peripheral wall 14. The ways 20 support and guide three master chuck jaws 22. Master chuck jaws 22 fit closely within the radially extending ways 20 and are movable toward and away from the center axis of the cylindrical body 10.

A through bore 25 is provided in the chuck body 10 behind each radially extending way 20. The bore is located and formed with a high degree of precision. The bore 25 extends at right angles to the radial extent of the way 20, and is located in the chuck somewhat beyond mid-way from the central axis to the outer periphery. A cavity 28 is provided in the cylindrical body 10 behind each radial extending way 20. Each cavity 28 is intersected by one of the through bores 25. A lever pin 29 is located within each through bore 25 and extends across each cavity 28. Each lever pin 29 is fixed within the respective through bore 25 by a set screw 30 to prevent rotation and to retain the pin in a fixed location in the bore.

Figure 4:
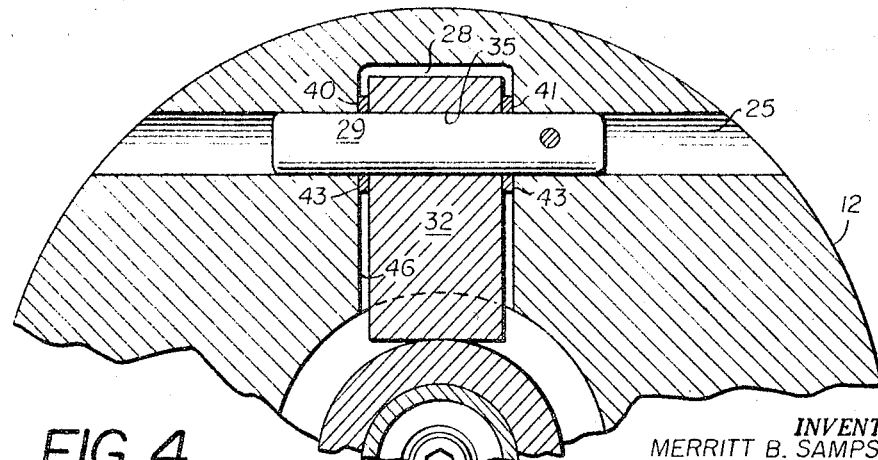
FIGURE 4 is a sectional view through the body of the chuck of FIGURE 1 taken along the line 4—4 and looking in the direction of the arrows.

An operating lever 32 is located centrally within each cavity 28, and is mounted on the respective lever pin 29 for free rotation. The operating lever is in the general form of a bell crank lever, and has a relatively short arm 33 and a longer arm 34. A through bore 35 (FIGURE 4) is formed in the lever at the juncture of the two arms 33 and 34. Lever pin 29 extends through the bore 35 and supports the operating lever 32 for arcuate movement. The shorter arm 33 of operating lever 32 is engaged in a slot 37 in the back of the associated chuck jaw 22. The end of the longer arm 34 of the operating lever 32 is contoured to form two cam following surfaces indicated at 38 and 39.

Two spacing elements, such as washers 40, 41 are mounted on each lever pin 29, one on each side of the associated operating lever 32. The washers 40 and 41 are located on each side of the operating lever 32. The radial surface 43 of each washer facing outwardly from the associated operating lever is in contact with surface 46 of the chuck body 10 forming the cavity 28. The two washers 40 and 41 maintain the operating lever 32 in predetermined alignment behind each associated chuck jaw 22. Thus, even though sufficient clearance has been provided between the operating lever 32 and fixed lever pin 29 to permit the lever to rotate easily, the washer prevents the lever 32 from becoming cocked out of alignment.

Figure 2:
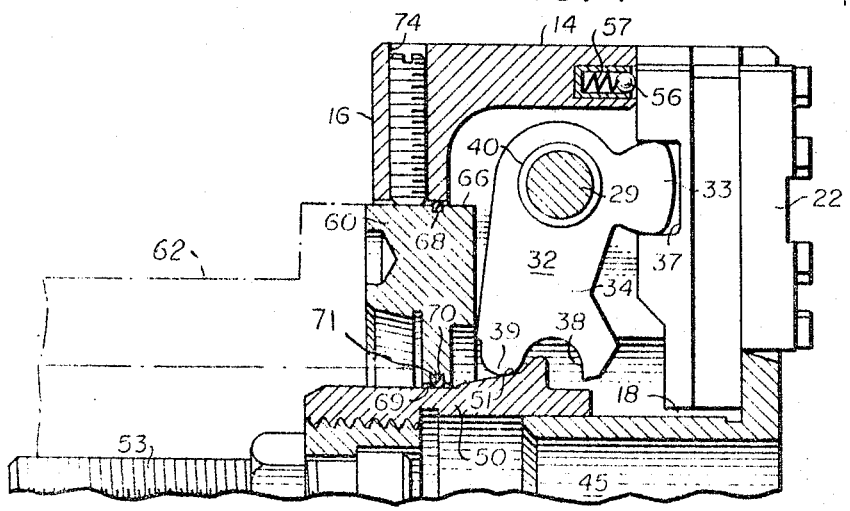
FIGURE 2 is a transverse sectional view similar to FIGURE 1 showing the chuck in a closed position.
Figure 3:
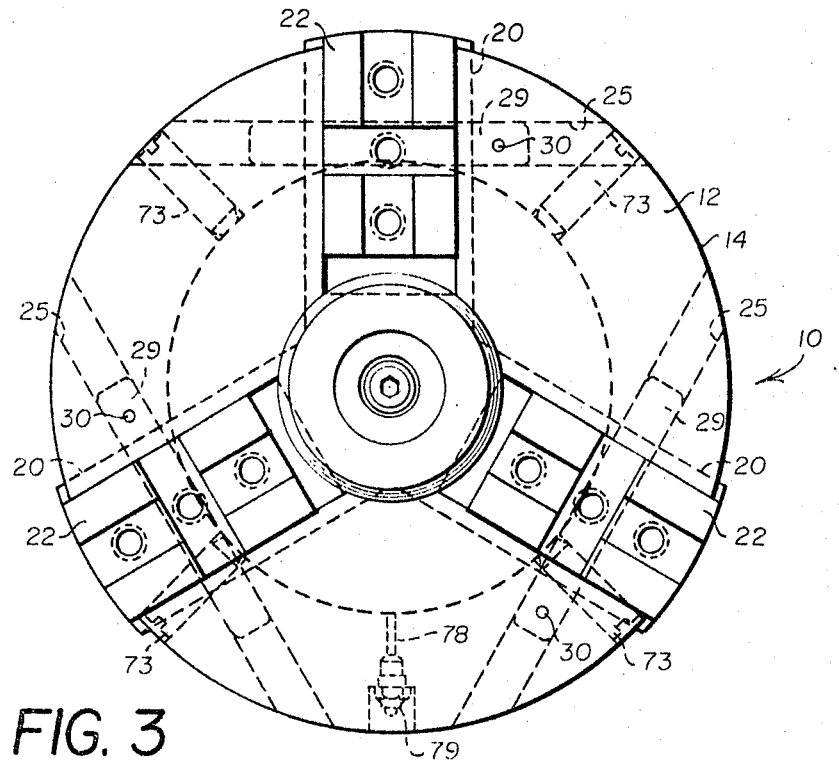
FIGURE 3 is a front elevational view of a chuck construction in accordance with the present invention.

An annular dust bushing 45 is located in the central opening 18 of the cylindrical body 10. The dust bushing includes a flange 49 and an axially extending tubular wall 48. An annular draw cam 50 is also located within the cylindrical body 10 of the chuck and partially surrounds the axially extending tubular wall of dust bushing 45, in telescoping arrangement. One end of the annular draw cam 10 extends rearwardly of the cylindrical body 10. A portion of the annular wall of the draw cam 50 is in the form of a cam surface 51 that coacts with the cam following surfaces 38 and 39 of the operating lever 32. A draw bolt 53 is fastened to the rearwardly extending portion of the annular cam 50 and serves to move the draw cam 50 axially with respect to the cylindrical body 10. Movement of the draw cam 50 rocks the longer arm 34 of the operating lever 32 between a forward and a back position. The forward position is shown in FIGURE 1 and the back position is shown in FIGURE 2. When the draw cam 50 is moved to the forward position shown in FIGURE 1, each operating lever 32 is rocked by action of the cam surface 51 on follower surface 38 to move the associated chuck jaw 22 radially along the way 20, away from the central axis of the cylindrical body 10. This releases a workpiece held between work holding jaws attached to the master chuck jaws 22. Movement of the draw cam 50 toward the back of the cylindrical body 10 rocks each operating lever 32 to the back position shown in FIGURE 2 by contact between the cam surface 51 and cam follower surface 39. This moves the master chuck jaws 22 toward the central axis of the cylindrical body 10 through movement of the shorter arm 33 engaged with the slot 37 in the back of the jaw 22.

Located within the peripheral wall 14, directly behind each chuck jaw 22 is a ball 56 biased outwardly by a coil spring 57. The ball 56 rides against a back surface 58 of the associated chuck jaw 22. The ball 56 retards relative sliding movement between the chuck jaw 22 and the radially extending way 20 in which the jaw is located. As a result, the position of the chuck jaw 22 is maintained constant in the absence of an actuating force applied through the operating lever 32. As can be seen by FIGURE 1, the draw cam 50 exerts positive force upon the cam following surfaces 38 and 39 only as the longer arm of the lever 32 approaches the front or back position. Thus, there is a central position through which the draw cam passes, when opening or closing the jaws, where gravity may act upon the chuck jaws 22, tending to move them in the radially extending ways 20. Such uncontrolled movement of the jaws with respect to a workpiece in the chuck, and the associated movement of the operating levers within the chuck are undesirable.

A back plate 60 is provided at the rear portion of the cylindrical body 10, spaced from and parallel to the radial front face 12. The back plate 60 is annular in shape, and is adapted to fit within the rear flange portion 16 and to closely surround a rearwardly extending portion of annular draw cam 50. The back plate 60 is fastened by machine screws to the cylindrical body 10 of the chuck and is mounted on a machine tool spindle 62 in a conventional manner.

An annular groove 64 is provided in the peripheral surface 66 of the back plate 60. Alternatively, the groove could be provided in the inwardly facing peripheral surface of the flange 16. A sealing element, such as an O-ring 68 is compressed within the annular groove 64 to provide a fluid-tight seal between the annular rear flange portion 16 and the peripheral surface 66 are of the back plate 60. The back plate 60 includes a narrow, inner peripheral surface 69 that closely encircles the draw cam 50. An annular groove 70 is formed in the inner peripheral surface 69 and contains a sealing element, such as an O-ring 71, that provides a fluid-tight seal between the back plate 60 and the draw cam 50, while allowing relative axial movement between the draw cam and the back plate.

A plurality of adjustment screws 73 are contained in radially extending, peripherally spaced threaded bores 74 in the rear flange portion 16 of the cylindrical body 10. The inner terminal ends of the adjustment screws 73 abut the peripheral surface of the back plate 60. In the embodiment shown, four equally spaced adjustment screws 73 are provided. Selective adjustment of these screws permits the chuck body 10 to be accurately located with respect to the center of the machine tool spindle. Adjustment of the screws permits accurate workpiece alignment and allows compensations to be made for wear of the chuck parts, thereby making it possible to provide extreme accuracy in the centering of workpieces.

A passageway 78 through the cylindrical body 10 communicates between a recessed grease fitting 79 and the cavities 28 of the chuck. Because the cylindrical body 10 is sealed by the back plate 60, grease or other lubricant may be introduced through the fitting 79 to completely surround or pack the internal moving parts, such as the operating levers, draw cam, and chuck jaw ways, with lubricant.

In operation, axial movement of the draw bolt 53 moves the draw cam 50 relative to the body of the chuck. Axial movement of the draw cam 50 causes the cam surface 51 to move the longer arm 34 of the operating lever 32 from the front position shown in FIGURE 1 to the rear position, as shown in FIGURE 2. This causes arcuate movement of the shorter arm 33 of each operating lever 32, which moves each master chuck jaw 22 radially of the cylindrical body 10. As movement of the draw cam moves the longer arm 34 of each operating lever 32, the operating lever rotates in an arcuate path about the supporting lever pin 29. Precise radial alignment of each operating lever 32 is maintained within the cylindrical body 10 by the washers 40 and 41 on each side of the levers.

Because the cavities 28 are filled with a lubricant, wear between the draw cam 50 and the cam follower surfaces 38 and 39, as well as wear between the shorter arm 33 and the respective slot 37 in the back of each jaw is minimized. Also, wear between the operating lever 32 and the lever pin 29 is reduced. Proper lubrication is assured, because contaminants, such as metal chips and coolant fluid, cannot enter the chuck, as through the back, because of the sealing relationship between the back plate 60 and the rear flange portion 16 of the cylindrical body 10.

By way of comparison, with a chuck constructed generally similar to the one of the present invention, but in which the lever pins were mounted at each end in lever pin bearings within the body of the chuck, accuracy only within a tolerance of 0.003 inch could be obtained. With the sealed chuck of the present invention, having fixed lever pins mounted directly in the chuck body and with the alignment of the operating levers assured by spacing washers on each side, the accuracy of the chuck has been increased to maintain accuracy within a tolerance of 0.001 inch and, if the same jaw is always positioned at the top position of the chuck each time a workpiece is inserted, thereby uniformly compensating each time for gravity, an accuracy within a tolerance of 0.0003 inch can be maintained. Moreover, because of the adequate lubrication and the freedom from contaminants that is assured by the total enclosure of the moving parts of the chuck, considerably less wear is experienced, greater gripping power is transmitted to the chuck jaws, and less maintenance is required, all contributing to greater accuracy.

While in the foregoing disclosure a preferred embodiment of the invention has been disclosed, numerous modifications or alterations may be made therein without departing from the spirit and scope of the invention, as set forth in the appended claims.

What is claimed is:

1. In a machine tool chuck having a plurality of movable work gripping jaw assemblies, the improvement in each assembly comprising a non-rotatable lever pin directly mounted in a through-bore in the chuck body, an operating lever mounted on said lever pin in a cavity within the chuck for free rotation relative to and about said pin and coacting with a master jaw of the work gripping jaw assembly to operate the jaw, and separate spacing elements about the lever pin on each side of the operating lever between the lever and the chuck body, maintaining the operating lever spaced from the chuck body and in predetermined alignment during movement in an arcuate path about the lever pin.

2. In a machine tool chuck having a plurality of movable work gripping jaw assemblies, the improvement in each assembly comprising:
   (a) a lever pin non-rotatably fixed within a bore in a machine tool chuck,
   (b) an operating lever mounted for rotation on said pin for moving a chuck jaw toward and away from the center of the chuck, and
   (c) two washers mounted on the lever pin, one on each side of the operating lever, restraining the operating lever from being cocked out of a predetermined alignment in its path of rotation about the lever pin.

3. In a machine tool chuck of cylindrical form, having a radial front face, a peripheral wall and an inwardly extending, radial, rear flange, and that is rotatable about the central longitudinal axis of the cylindrical chuck; a plurality of movable jaws in the radial front face; a through-bore in the chuck body behind each movable jaw; a non-rotatable lever pin directly mounted in each through-bore; an operating lever mounted on said lever pin behind each movable jaw for free rotation relative to and about said pin and coacting with said jaw for moving the jaw radially of the front face of the chuck body; a central opening extending along the longitudinal axis; a tubular dust bushing extending along the central opening and having a flange that abuts the radial front face, closing the central opening at the radial front face; a draw cam generally tubular in shape having an annular cam surface along the tubular wall and an outwardly extending cylindrical portion, said draw cam in part encircling the tubular dust bushing in telescoping relationship and in part extending from a back portion of the cylindrical chuck, opposite the radial front face; an annular back plate encircling the extending cylindrical part of the draw cam and having an outer peripheral surface encircled by the radial rear flange of the chuck; radial adjustment screws carried by the radial rear flange abutting the outer peripheral surface of the annular back plate to adjust the chuck body relative to the back plate; axis seal between the back plate and radial rear flange offset from the adjustment screws, to provide a fluid-tight axial seal between the back plate and radial rear flange while permitting relative radial movement between the rear flange and the back plate; and resilient means between the back plate and the extending cylindrical part of the draw cam to provide a fluid-tight axial seal therebetween while permitting relative axial movement between the back plate and the draw cam.

4. The chuck of claim 3 including a friction amplifier operatively associated with each of the movable jaws and constructed and arranged to restrain movement of each jaw radially of the front face of the chuck body.

5. The chuck of claim 3 including two washers mounted on the lever pin, one on each side of the operating lever, restraining the operating lever from being cocked out of predetermined alignment in its path of rotation about the pin.

References Cited
UNITED STATES PATENTS

| | | | |
|---|---|---|---|
| 2,083,414 | 6/1937 | Wettig | 279—1 |
| 2,422,785 | 6/1967 | Johnson | 279—119 |
| 2,602,673 | 7/1952 | Deuring | 279—121 |
| 2,712,449 | 7/1955 | Grobey | 279—106 |
| 2,729,459 | 1/1956 | Leifer | 279—119 |
| 2,767,994 | 10/1956 | Gamet | 279—119 |
| 2,830,823 | 4/1958 | Becker | 279—110 |
| 3,178,192 | 4/1965 | Sampson | 279—119 |
| 3,251,606 | 5/1966 | Oswald | 279—119 |

ROBERT C. RIORDON, Primary Examiner

J. C. PETERS, Assistant Examiner

UNITED STATES PATENT OFFICE
CERTIFICATE OF CORRECTION

Patent No. 3,464,712　　　　　　　　　　　　September 2, 1969

Merritt B. Sampson et al.

It is certified that error appears in the above identified patent and that said Letters Patent are hereby corrected as shown below:

Column 2, line 37, "opearting" should read -- operating --.
Column 3, line 40, "10", first occurrence, should read -- 50 --.
Column 6, line 24, "axis seal" should read -- resilient means --; same line 24, "radial" should read -- the --.

Signed and sealed this 30th day of December 1969.

(SEAL)
Attest:

Edward M. Fletcher, Jr.　　　　　　　　　　WILLIAM E. SCHUYLER, JR.
Attesting Officer　　　　　　　　　　　　　Commissioner of Patents